United States Patent [19]

Giles, Jr. et al.

[11] 4,393,168

[45] Jul. 12, 1983

[54] BLENDS OF POLYETHERIMIDES AND RUBBER MODIFIED VINYL AROMATIC POLYMERS

[75] Inventors: Harold F. Giles, Jr., Cheshire, Mass.; Dwain M. White, Schenectady, N.Y.

[73] Assignee: General Electric Company, Pittsfield, Mass.

[21] Appl. No.: 359,261

[22] Filed: Mar. 18, 1982

[51] Int. Cl.$^3$ ............................................. C08L 79/08
[52] U.S. Cl. ....................................... 525/66; 525/180
[58] Field of Search ........................... 525/66, 180, 184

[56] References Cited

U.S. PATENT DOCUMENTS 4,255,471  3/1981  Boldebuck ........................... 525/183

FOREIGN PATENT DOCUMENTS 55-18443  2/1980  Japan ..................................... 525/184

Primary Examiner—Paul Lieberman
Attorney, Agent, or Firm—Bernard, Rothwell & Brown

[57] ABSTRACT

Disclosed are blends of (a) a polyetherimide and (b) a rubber modified vinyl aromatic polymer. Depending upon the particular rubber modified vinyl aromatic polymer used in preparing the blends, one or more of the properties of impact strength, heat distortion temperature, flexural properties and tensile properties of the blends are improved over those associated with the polyetherimide component alone or with the rubber modified vinyl aromatic polymer alone.

12 Claims, No Drawings

BLENDS OF POLYETHERIMIDES AND RUBBER MODIFIED VINYL AROMATIC POLYMERS

The subject invention relates to a class of blends of polyetherimides and rubber modified vinyl aromatic polymers, e.g., rubber modified styrenes and styrene copolymers. Depending upon the particular rubber modified vinyl aromatic polymer used in preparing the blends, one or more of the properties of impact strength, heat distortion temperature, flexural properties and tensile properties of the blends are improved as compared with those associated with the polyetherimide component alone or with the rubber modified vinyl aromatic polymer alone.

The blends of the invention include a polyetherimide of the formula:

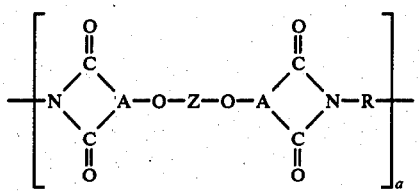

where a represents a whole number in excess of 1, e.g., 10 to 10,000 or more, the group —O—A< is selected from:

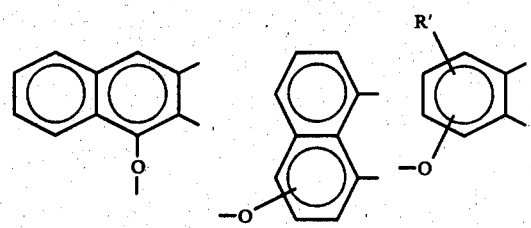

R' being hydrogen, lower alkyl or lower alkoxy, preferably the polyetherimide includes the latter —O—A< group where R' is hydrogen such that the polyetherimide is of the formula:

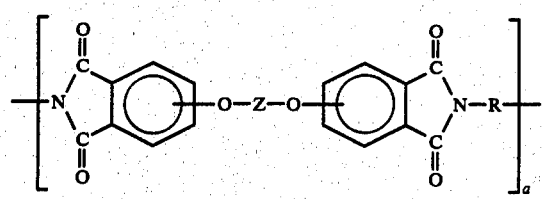

and the divalent bonds of the —O—Z—O— radical are in the 3,3'; 3,4'; 4,3' or the 4,4' position; Z is a member of the class consisting of (1)

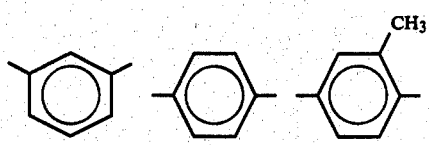

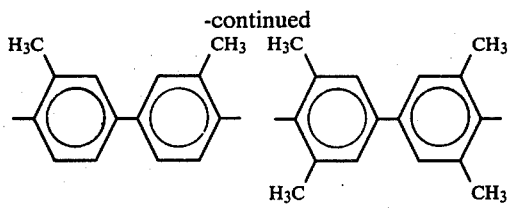

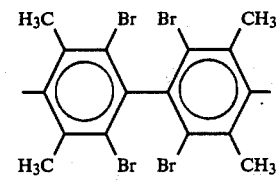

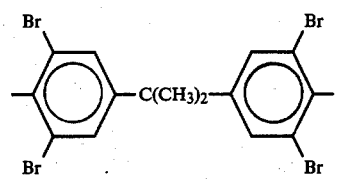

and (2) divalent organic radicals of the general formula:

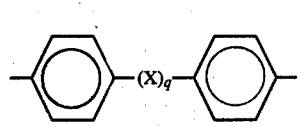

where X is a member selected from the class consisting of divalent radicals of the formulas,

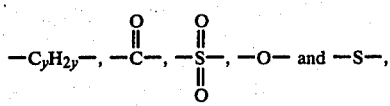

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

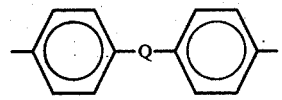

where Q is a member selected from the class consisting of

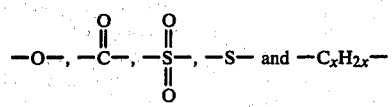

where X is a whole number from 1 to 5 inclusive. Particularly preferred polyetherimides for the purposes of the present invention include those where —O—A< and Z respectively are:

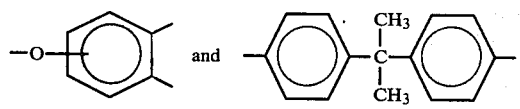

and R is selected from:

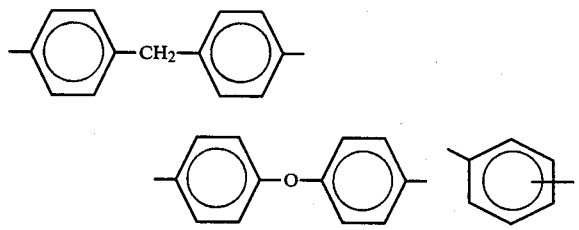

The polyetherimides where R is metaphenylene are most preferred.

The rubber modified vinyl aromatic polymers of the blends of the invention contain homopolymers and/or copolymers derived from a vinyl aromatic monomer of the structural formula

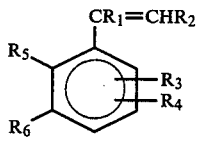

where $R_1$ and $R_2$ are selected from the group consisting of hydrogen and lower alkyl or lower alkenyl groups of from 1 to 6 carbon atoms; $R_3$ and $R_4$ are selected from the group consisting of hydrogen, halogen such as chlorine or bromine, and lower alkyl of 1 to 6 carbon atoms; $R_5$ and $R_6$ are selected from the groups consisting of hydrogen and lower alkyl and alkenyl groups of 1 to 6 carbon atoms or $R_5$ and $R_6$ may form an unsaturated hydrocarbyl ring structure.

Generally, the rubber modified vinyl aromatic polymers are derived from at least 25%, preferably at least about 50%, of the above vinyl aromatic monomers. Vinyl aromatic monomers of the above formula include styrene, α-methylstyrene, t-butylstyrene, vinyl toluene, vinyl xylene, ethyl vinyl benzene, chlorostyrene, ethyl vinyl toluene, isopropenyl toluene and diethyl vinyl benzene. A preferred vinyl aromatic monomer is styrene.

Other monomers which can be copolymerized with the above vinyl aromatic monomers include those of the general formula:

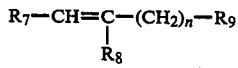

wherein $R_8$ and $R_7$ are selected from the group consisting of hydrogen, halogen, alkyl groups of 1 to 4 carbon atoms, carboalkoxy or $R_7$ and $R_8$ taken together represent an anhydride linkage (—COOOC—) and $R_9$ is selected from hydrogen, vinyl, alkyl or alkenyl groups having from 1 to 12 carbon atoms, cycloalkyl, carboalkoxy, alkoxy-alkyl, alkyl carboxy, ketoxy, halogen, carboxy, cyano or pyridyl and n is 0 or an integer from 1 to 9. Copolymerizable monomers of the above formula include acrylonitrile, methacrylonitrile, acrylic acid, methacrylic acid, maleic anhydride, vinyl chloride, vinylidene chloride, methyl methacrylate, ethyl acrylate, acrylamide, butadiene, isoprene and the like.

The above vinyl aromatic homopolymers or copolymers are modified by the incorporation of a rubber or elastomeric material. Such an incorporation can be accomplished by blending or graft or block copolymerization with the homopolymer or copolymer derived from the vinyl aromatic monomer. Suitable rubbers include polymers of aliphatic conjugated dienes such as 1,3-butadiene, isoprene, methylisoprene as well as ethylene propylene copolymers and EPDM rubber.

Preferred rubber modified vinyl aromatic polymers for the purposes of the present invention include the various grades of methylmethacrylate-butadiene-styrene (MBS), styrene-ethylene-butylene-styrene, acrylonitrile-butadiene-styrene (ABS) and high impact polystyrene (HIPS) which is polystyrene containing from about 3 to 10% by weight of polybutadiene or a styrene-butadiene copolymer.

The polyetherimides can be obtained by any of the methods well known to those skilled in the art including the reaction of any aromatic bis(ether anhydrides) of the formula

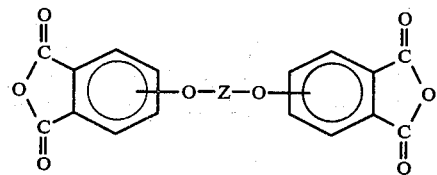

where Z is as defined hereinbefore with an organic diamine of the formula $$H_2N-R-NH_2$$

where R is as defined hereinbefore.

Aromatic bis(ether anhydride)s of the above formula include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy) benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benezene dianhydride; 1,4-bis(3,4-dicarboxyphenoxy)benzene dianhydride, 4,4'-bis(3,4-dicarboxyphenoxy)benzophenone dianhydride; 4-(2,3-dicarboxyphenoxy)-4'-(3,4-dicarboxyphenoxy)diphenyl 1-2,2-propane dianhydride; etc. and mixtures of such dianhydrides.

In addition, aromatic bis(ether anhydride)s also included by the above formula are shown by Koton, M. M; Florinski, F. S.; Bessonov, M. I.; Rudakov, A. P. (Institute of Heteroorganic compounds, Academy of Sciences, U.S.S.R.), U.S.S.R. No. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphyenyl ether, 1,5-diaminonaphthalene, 3,3'-dimenthylbenzidine, 3,3'-dimethoxybenzidine, 2,4-bis($\beta$-amino-t-butyl)toluene, bis(p-$\beta$-amino-t-butylphenyl)ether, bis(p-$\beta$-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis (3-aminopropyl)amine, hexamethylenediamine, heptamethylenediamine, nonamethylenediamine, decamethylenediamine, bis(3-aminopropyl) tetramethyldisiloxane, bis(4-aminobutyl) tetramethyldisiloxane, and the like.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° and 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [$\eta$] greater than 0.2 deciliters per gram, preferably 0.35 to 0.60, or 0.7 deciliters per gram or even higher when measured in m-creasol at 25° C.

The rubber modified vinyl aromatic polymers used in the blends of this invention can be prepared by any of the techniques well known in the art. For example, a method for preparing acrylonitrile-butadiene-styrene or acrylonitrile-butadiene-methylstyrene type polymers comprises grafting 73 parts styrene and 42 parts acrylonitrile onto polybutadiene latex containing 58 parts polybutadiene in the presence of 3 parts soap, 1.7 parts mercaptan and 0.4 parts potassium peroxydisulfate at 50° C. The latex is coagulated and the product is then milled for 10 minutes at 320° F. Other useful methods for preparing these polymers may be found in U.S. Pat. No. 2,505,349; U.S. Pat. No. 2,550,139; U.S. Pat. No. 2,698,313; U.K. Pat. No. 698,385; U.S. Pat. No. 2,713,566; U.S. Pat. No. 2,820,773; and U.S. Pat. No. 2,908,661, all of which are hereby incorporated by reference. In addition, a great number of these polymers are available commercially.

In accordance with the present invention, blends of a polyetherimide and a rubber modified vinyl aromatic polymer are generally obtainable in all proportions of the two polymers relative to each other. Consequently, blends comprising from about 1 to about 99%, by weight, polyetherimide and from about 99 to about 1%, by weight rubber modified vinyl aromatic polymer are included within the scope of the invention. By controlling the proportions of the polyetherimide and polymer relative to each other, blends having certain predetermined properties which are improved over those of polyetherimide component or the polymer alone may be alone readily obtained. In general, the blends of the invention exhibit, depending upon the particular rubber modified vinyl aromatic polymer used in preparing the blends, one or more of the properties of improved impact strength, flexural properties and tensile properties as compared with those associated with the polyetherimide or polymer component alone. As a general rule, the more the rubber modified vinyl aromatic polymer exhibits elastomeric behavior, the general tendency is for the blends of the invention to have an improved impact strength over that of the polyetherimide. On the other hand, the less elastomeric behavior exhibited by the rubber modified vinyl aromatic polymer, the more likely the blends are to have improved flexural and tensile properties as compared with the rubber modified vinyl aromatic polymer alone.

It is contemplated that the blends of the present invention may also include additive materials such as fillers, stabilizers, plasticizers, flexibilizers, surfactant agents, pigments, dyes, reinforcements, flame retardants and diluents in conventional amounts. It is also contemplated that the blends of the invention may include two or more rubber modified vinyl aromatic polymers with one or more polyetherimides or two or more rubber modified vinyl aromatic polymers in combination with one or more polyetherimides.

Methods for forming the blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the recent invention can be used in automobile and aviation applications for decorative and protective purposes, and as high temperature electrical insulation for motor slot liners, transformers, dielectric capacitors, cable and coil wrappings (form wound coil insulation for motors), and for containers and container linings. The blends can also be used in laminated structure where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject blends can also serve in printed circuit applications.

Alternatively, solutions of the blends herein described can be coated on electrical conductors such as copper, aluminum, etc. and thereafter the coated conductor can be heated at elevated temperatures to remove the solvent and provide a continuous resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention by incorporating such fillers as asbestos, glass fibers, talc, quartz powder, finely divided carbon, silica and the like into the blends prior to molding. Shaped articles may be formed under heat, or under heat and pressure, in accordance with practices well-known in the art.

The following examples illustrate specific polyetherimide-rubber modified vinyl aromatic polymer blends in accordance with the present invention. It should be understood that the examples are given for the purpose of illustration and do not limit the invention. In the examples, all parts and percentages are by weight unless otherwise specified.

cially under the trade name BTA III N by Borg Warner Corporation. The blend of the two polymers was then extruded in 28 mm ZSK twin screw extruder having a temperature profile varying from about 310° to 329° C. and a die temperature of about 310° C. The resulting extrudate was comminuted into pellets and the pellets injection molded into test specimens in a molding machine at a temperature of about 321° C. The specimens were opaque, one phase systems with good surface qualities and appearance. The impact strength of these specimens was measured according to the unnotched and notched Izod test, and the results are set forth in Table I. The heat distortion temperature, flexural properties, and tensile properties were also measured and are given in Table I.

EXAMPLE II

The procedure of Example I was repeated with the exception that about 90 parts of polyetherimide were blended with about 10 parts of MBS I to produce the blend according to the invention. The results of the notched and unnotched Izod impact test, as well as the heat distortion temperature, flexural properties and tensile properties for test specimens of the blend are detailed in Table I.

EXAMPLE III

The procedure of Example I was repeated with the exception that about 85 parts of polyetherimide were blended with about 15 parts of MBS I to produce the blend according to the invention. The results of the notched and unnotched Izod impact test, as well as the heat distortion temperature, flexural properties and tensile properties for test specimens of the blend are detailed in Table I.

TABLE I

| Example | % MBS | Izod Impact[1] 3.2mm bar (ft lbs/in) Notched | Izod Impact[1] 3.2mm bar (ft lbs/in) Unnotched | Heat Distortion Temperature (0° C.[2] @ 1.82 MPa) | Flexural Properties[3] Initial Modulus (PSI × 10$^5$) | Flexural Properties[3] Strength 6.2mm Defl. (PSI × 10$^4$) | Flexural Properties[3] Ultimate Strength (PSI × 10$^4$) | Tensile Properties[4] Yield % | Tensile Properties[4] Yield (PSI × 10$^4$) | Tensile Properties[4] Failure % | Tensile Properties[4] Failure (PSI × 10$^4$) |
|---|---|---|---|---|---|---|---|---|---|---|---|
|  | 0 | 0.6 | 23.0 | 192 | 4.80 | 1.94 | 2.38 | 13 | 1.53 | 30 | 1.22 |
| I | 5 | 0.7 | 29.4 | 180 | 4.71 | 1.81 | 2.24 | 12 | 1.42 | 20 | 1.18 |
| II | 10 | 1.1 | 20.1 | 195 | 4.06 | 1.67 | 1.97 |  |  |  |  |
| III | 15 | 0.5 | 22.9 | 173 | 4.04 | 1.65 | 1.97 | 12 | 1.23 | 34 | 1.10 |

[1]Tested according to ASTM method D-256. Unnotched bars contain no notch.
[2]Tested according to ASTM method D-648 using a 3.2mm bar.
[3]Tested according to ASTM method D-790 using a 3.2mm bar at 1.27mm/min crosshead speed.
[4]Tested according to ASTM method D-638 using a Type I bar with a 5.08mm/min crosshead speed.

EXAMPLE I

A blend of polyetherimide and methyl methacrylate-butadiene-styrene according to the invention was prepared, the blend molded into test specimens, and the specimens, tested for various physical properties.

The polyetherimide for the blend was prepared from the reaction product of essentially equimolar amounts of 2,2-bis[4-(3,4-dicarboxyphenoxy)phenyl] propane dianhydride and m-phenylene diamine produced at elevated temperature of about 250° to about 300° C. and under nitrogen atmosphere. The polymer was extruded at about 300° C. to form a strand and then mechanically chopped into pellets. A specimen molded from the pellets was tested for various properties and the results of these tests are set forth at the top of Table I.

About 95 parts of the above polyetherimide were mixed with about 5 parts of a methylmethacrylate-butadiene-styrene (hereinafter MBS I) sold commer- As is evident from the above experimental results, blends of the polyetherimide and the MBS I have an improved impact strength over the polyetherimide component alone as evidenced by the notched and unnotched Izod impact values, and the blends exhibit good tensile, flexural and heat distortion properties.

EXAMPLE IV

A blend of polyetherimide and methyl methacrylate-butadiene-styrene according to the invention was prepared, the blend molded into test specimens and the test specimens tested for various physical properties.

About 95 parts of a polyetherimide made in accordance with the procedure of Example I and having the physical properties set forth in Table II were mixed with about 5 parts of methylmethacrylate-butadiene-styrene (hereinafter MBS II) sold commercially under the trade name BTA IIIS by Borg Warner Corporation.

The mixture of the two polymers was then extruded in a ZSK twin screw extruder having a temperature profile varying from about 310° to 329° C. and a die temperature of about 310° C. The resulting extrudate was comminuted into pellets and the pellets injection molded into test specimens at a temperature of 322° C. The molded specimens were opaque, one phase systems with good surface qualities and appearance. Impact strengths of these specimens were measured according to the unnotched and notched Izod test and the results are set forth in Table II. The heat distortion temperature, glass transition temperature, flexural properties, and tensile properties of the test specimens of the blend were also measured and are given in Table II.

EXAMPLE V

The procedure of Example IV was repeated with the exception that about 90 parts of polyetherimide were blended with about 10 parts of MBS II to produce the blend according to the invention. The results of the notched and unnotched Izod impact test, as well as the heat distortion temperature, flexural properties and tensile properties for test specimens of the blend are detailed in Table II.

EXAMPLE VI

The procedure of Example IV was repeated with the exception that about 85 parts of polyetherimide were blended with about 15 parts of MBS II to produce the blend according to the invention. The results of the notched and unnotched Izod impact test, as well as the heat distortion temperature, flexural properties and tensile properties for test specimens of the blend are detailed in Table II.

profile varying from about 600° to 630° F. and a die temperature of about 590° F.

The resulting extrudate was comminuted into pellets and the pellets injection molded at about 610° F., into test specimens. Impact strength of these specimens was measured according to the standard unnotched and notched Izod test and the results are set forth in Table III. The heat distortion temperature, flexural properties and tensile properties of the blend were also measured and are given in Table III.

EXAMPLE VIII

The procedure of Example VII was repeated with the exception that about 70 parts of polyetherimide were blended with about 30 parts of ABS to produce the blend according to the invention and that the extruder temperature profile was between about 580° and 610° F. with a die temperature of about 570° F. and a molding temperature of about 550° F. The results of the notched and unnotched Izod impact test, as well as the heat distortion temperature, flexural properties and tensile properties for test specimens of the blend are detailed in Table III.

EXAMPLE IX

The procedure of Example VIII was repeated with the exception that about 50 parts of polyetherimide were blended with about 50 parts of ABS to produce the blend according to the invention and that the extruder temperature profile was between about 540° and 605° F. with a die temperature of about 530° F. The results of the notched and unnotched Izod impact test, as well as the heat distortion temperature, flexural properties and tensile properties for test specimens of the

TABLE II

| Example | % MBS | Izod Impact,[1] 3.2mm bar (ft lbs/in) Notched | Izod Impact,[1] 3.2mm bar (ft lbs/in) Unnotched | Heat Distortion Temperature (0° C.[2] @ 1.82 MPa) | Flexural Properties[3] Initial Modulus (PSI × 10$^5$) | Flexural Properties[3] Strength 6.2mm Defl. (PSI × 10$^4$) | Flexural Properties[3] Ultimate Strength (PSI × 10$^4$) | Tensile Properties[4] Yield % | Tensile Properties[4] Yield (PSI × 10$^4$) | Tensile Properties[4] Failure % | Tensile Properties[4] Failure (PSI × 10$^4$) |
|---|---|---|---|---|---|---|---|---|---|---|---|
|  | 0 | 0.6 | 23.0 | 192 | 4.80 | 1.94 | 2.38 | 13 | 1.53 | 30 | 1.22 |
| IV | 5 | 0.9 | 41.3 | 180 |  |  |  | 16 | 1.47 | 47 | 1.21 |
| V | 10 | 1.0 | 48.1 | 199 | 4.44 | 1.77 | 2.07 | 16 | 1.41 | 33 | 1.21 |
| VI | 15 | 0.5 |  | 167 |  |  |  | 15 | 1.15 | 18 | 1.11 |

[1]Tested according to ASTM method D-256. Unnotched bars contain no notch.
[2]Tested according to ASTM method D-648 using a 3.2mm bar.
[3]Tested according to ASTM method D-790 using a 3.2mm bar at 1.27mm/min crosshead speed.
[4]Tested according to ASTM method D-638 using a Type I bar with a 5.08mm/min crosshead speed.

As can be observed from the above experimental results, blends of the polyetherimide and the MBS II have an improved impact strength over the polyetherimide alone as evidenced by the Izod impact values and have good tensile, flexural and heat distortion properties.

EXAMPLE VII

A blend of polyetherimide and acrylonitrile-butadiene-styrene according to the invention was prepared, the blend molded into test specimens, and the specimens tested for various physical properties.

About 90 parts of the above polyetherimide made in accordance with the procedure of Example I and having the physical properties set forth in Table III were mixed with 10 parts of a acrylonitrile-butadiene-styrene (hereinafter ABS) sold commercially under the trade name DOW 213 by the Dow Chemical Company. The mixture of the two polymers was then extruded in a 28 mm Werner & Pfleiderer extruder having a temperature blend are detailed in Table III.

EXAMPLE X

The procedure of Example VIII was repeated with the exception that about 30 parts of polyetherimide were blended with about 70 parts of ABS to produce the blend according to the invention and that the extruder temperature profile was between about 520° and 605° F. with a die temperature of about 510° F. The results of the notched and unnotched Izod impact test, as well as the heat distortion temperature, flexural properties and tensile properties for test specimens of the blend are detailed in Table III.

EXAMPLE XI

The procedure of Example X was repeated with the exception that about 10 parts of polyetherimide were blended with about 90 parts of ABS to produce the blend according to the invention. The results of the notched Izod impact test, as well as the heat distortion temperature, flexural properties and tensile properties for test specimens of the blend are detailed in Table III.

During extrusion of the blends of Examples IX–XI, it was noted that the extrudate contained brown spots due to the polyetherimide component being not completely melted and dispersed in the ABS and thus a small portion of the polyetherimide was vented from the extruder. This processing problem can be overcome by heating the feed throat of the extruder barrel to a relatively high temperature so as to melt the polyetherimide and then introducing the ABS downstream in the extruder barrel. Alternatively, a powder of the polyetherimide could be used to provide better heat transfer in melting.

Table IV. The heat distortion temperature, flexural properties, and tensile properties of the test specimens of the blend were also measured and are given in Table IV.

EXAMPLE XIII

The procedure of Example XII was repeated with the exception that about 70 parts of polyetherimide were blended with about 30 parts of HIPS to produce the blend according to the invention. The results of the notched and unnotched Izod impact test, as well as the heat distortion temperature, flexural properties and tensile properties for test specimens of the blend are detailed in Table IV.

TABLE III

| Example | % Poly-ether-imide | ABS % | Izod Impact, 3.2mm bar (ft lbs/in)[1] Notched | Unnotched | HDT °C. @ 1.82 MPa[2] | Flexural Properties[3] Initial Modulus (PSI × 10$^5$) | Strength @ 6.2mm Defl. (PSI × 10$^4$) | Ultimate Strength (PSI × 10$^4$) | Tensile Properties[4] Yield % | (PSI × 10$^3$) | Failure % | (PSI × 10$^3$) |
|---|---|---|---|---|---|---|---|---|---|---|---|---|
|  | 100 | 0 | 0.64 | 19.5 | 192 | 4.80 | 1.94 | 2.38 | 13 | 15.3 | 30 | 12.2 |
| VII | 90 | 10 | 0.63 | 5.33 | 172 | 4.92 | — | 1.93 | — | — | 6 | 9.40 |
| VIII | 70 | 30 | 0.35 | 53.03 | 119 | 4.87 | 1.71 | 1.71 | — | — | 4.75 | 8.12 |
| IX | 50 | 50 | 0.25 | 1.91 | 92.7 | 4.13 | 0 | 1.15 | — | — | 7.0 | 5.72 |
| X | 30 | 70 | 0.59 | 1.05 | 80 | 4.27 | 0 | 0.84 | — | — | 4.1 | 4.39 |
| XI | 10 | 90 | 0.67 | 1.77 | 78 | 3.83 | 0.82 | 0.82 | 3.5 | 4.17 | 7.16 | 3.60 |
|  | 0 | 100[5] | 2.76 | 31.6 | 78 | 3.28 | 0.77 | 0.77 | 4.3 | 3.75 | 72 | 4.00 |

[1]Tested according to ASTM method D-256. Unnotched bars contain notch on back side.
[2]Tested according to ASTM method D-648 using a 3.2mm bar.
[3]Tested according to ASTM method D-790 using a 3.2mm bar at a 1.27mm/min crosshead speed.
[4]Tested according to ASTM method D-638 using a Type I bar with a 5.08mm/min crosshead speed.
[5]From published data.

From the data set forth above in Table III, it can be observed that the polyetherimide-ABS blends containing a small amount of polyetherimide have better characteristics in terms of heat distortion temperature, flexural properties and tensile properties as compared with ABS alone and that blends containing small amounts of ABS have somewhat comparable properties to that of the polyetherimide and thus the ABS can act as an inexpensive filler for the polyetherimide to provide an acceptable material for selected applications.

EXAMPLE XII

A polyetherimide-high impact polystyrene blend according to the invention was prepared, the blend molded into test specimens and the test specimens tested for various physical properties.

About 90 parts of a polyetherimide made in accordance with the procedure of Example I and having the physical properties set forth in Table IV were mixed with about 10 parts of a high impact polystyrene (hereinafter HIPS) sold commercially under the trade name 9100 natural Tufflex by the Foster Grant Co., Inc. The mixture of the two polymers was then extruded in a Werner & Pfleiderer extruder having a temperature profile varying from about 600° to 630° F. and a die temperature of about 590° F. The resulting extrudate was comminuted into pellets and the pellets injection molded into test specimens. Impact strength of these specimens were measured according to the unnotched and notched Izod test and the results are set forth in

EXAMPLE XIV

The procedure of Example XII was repeated with the exception that about 50 parts of polyetherimide were blended with about 50 parts of HIPS to produce the blend according to the invention. The results of the notched and unnotched Izod impact test, as well as the heat distortion temperature, flexural properties and tensile properties for test specimens of the blend are set forth in Table IV.

EXAMPLE XV

The procedure of Example XII was repeated with the exception that about 30 parts of polyetherimide were blended with about 70 parts of HIPS to produce the blend according to the invention. The results of the notched and unnotched Izod impact test, as well as the heat distortion temperature, flexural properties and tensile properties for test specimens of the blend are set forth in Table IV.

EXAMPLE XVI

The procedure of Example XII was repeated with the exception that about 10 parts of polyetherimide were blended with about 90 parts of HIPS to produce the blend according to the invention. The results of the notched and unnotched Izod impact test, as well as the heat distortion temperature, flexural properties and tensile properties for test specimens of the blend are detailed in Table IV.

TABLE IV

| Example | % Poly-ether-imide | % HIPS | Izod Impact[1] 3.2mm bar (ft lbs/in) Notched | Unnotched | HDT °C. @ 1.82 MPa[2] | Flexural Properties[3] Initial Modulus (PSI × 10$^5$) | Strength @ 6.2mm Defl. (PSI × 10$^4$) | Ultimate Strength (PSI × 10$^3$) | Tensile Properties[4] Yield % | (PSI × 10$^3$) | Failure % | (PSI × 10$^3$) |
|---|---|---|---|---|---|---|---|---|---|---|---|---|
|  | 100 | 0 | 0.64 | 19.5 | 192 | 4.80 | 1.94 | 2.38 | 13 | 15.3 | 30 | 12.2 |

TABLE IV-continued

| Example | % Poly-ether-imide | % HIPS | Izod Impact[1] 3.2mm bar (ft lbs/in) Notched | Izod Impact[1] 3.2mm bar (ft lbs/in) Unnotched | HDT °C. @ 1.82 MPa[2] | Flexural Properties[3] Initial Modulus (PSI × 10⁵) | Flexural Properties[3] Strength @ 6.2mm Defl. (PSI × 10⁴) | Flexural Properties[3] Ultimate Strength (PSI × 10³) | Tensile Properties[4] Yield % | Tensile Properties[4] Yield (PSI × 10³) | Tensile Properties[4] Failure % | Tensile Properties[4] Failure (PSI × 10³) |
|---|---|---|---|---|---|---|---|---|---|---|---|---|
| XII | 90 | 10 | 0.89 | 4.40 | 175 | 4.95 | 1.57 | 16.4 | — | — | 6.0 | 7.57 |
| XIII | 70 | 30 | 0.51 | 2.24 | 141 | 4.53 | 0 | 11.3 | — | — | 4.8 | 6.43 |
| XIV | 50 | 50 | 0.28 | 1.13 | 91 | 4.40 | 0 | 9.26 | — | — | 3.6 | 5.64 |
| XV | 30 | 70 | 0.24 | 1.01 | 79 | 3.17 | 0 | 5.18 | — | — | 3.8 | 2.97 |
| XVI | 10 | 90 | 0.44 | 1.14 | 75 | 4.12 | — | 5.89 | — | — | 4.3 | 2.96 |

[1]Tested according to ASTM method D-256. Unnotched bars contain notch on back side.
[2]Tested according to ASTM method D-648 using a 3.2mm bar.
[3]Tested according to ASTM method D-790 using a 3.2mm bar at a 1.27mm/min crosshead speed.
[4]Tested according to ASTM method D-638 using a Type I bar with a 5.08mm/min crosshead speed.

From the data presented in Table IV, it may be noted that the incorporation of polyetherimide in HIPS resulted in increased flexural properties with higher concentration of the polyetherimide and that the heat distortion properties increase dramatically after the phase inversion from a HIPS continuous phase to one of polyetherimide at about a 50-50 blend ratio. Increases are also observed in the tensile properties with greater concentration of polyetherimide but the impact properties are somewhat low throughout the entire blend series.

Substitution of other polyetherimides and/or other rubber modified vinyl aromatic polymers for the polyetherimides and/or polymers in the blends of the above examples may result in the formulation of polyetherimide-rubber modified vinyl aromatic polymer blends having similar characteristics such as improved impact strength as compared with the polyetherimide component alone or better tensile or flexural properties than that of the polymer alone and such blends are considered within the scope of the present invention.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of (a) a rubber modified vinyl aromatic polymer and (b) a polyetherimide.

2. A composition in accordance with claim 1 wherein the rubber modified vinyl aromatic polymer contains a homopolymer and/or copolymer derived from a vinyl aromatic monomer of the structural formula:

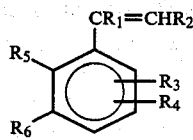

where $R_1$ and $R_2$ are selected from the group consisting of hydrogen, lower alkyl or lower alkenyl groups of from 1 to 6 carbon atoms; $R_3$ and $R_4$ are selected from the group consisting of hydrogen, halogen, and lower alkyl of 1 to 6 carbon atoms; $R_5$ and $R_6$ are selected from the group consisting of hydrogen and lower alkyl and alkenyl groups of 1 to 6 carbon atoms or $R_5$ and $R_6$ may form an unsaturated hydrocarbyl ring structure.

3. A composition in accordance with claim 2 wherein the rubber modified vinyl aromatic polymer is a copolymer from a monomer of the general formula;

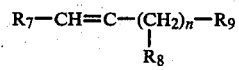

wherein $R_8$ and $R_7$ are selected from the group consisting of hydrogen, halogen, alkyl groups of 1 to 4 carbon atoms, carboalkoxy or $R_7$ and $R_8$ taken together represent an anhydride linkage (—COOOC—) and $R_9$ is selected from hydrogen, vinyl, alkyl or alkenyl groups having from 1 to 12 carbon atoms, cycloalkyl, carboalkoxy, alkoxy-alkyl, alkyl carboxy, ketoxy, halogen, carboxy, cyano or pyridyl and n is 0 or an integer from 1 to 9.

4. A composition in accordance with claim 2 wherein the rubber for the rubber modified vinyl aromatic polymer is selected from polymers of aliphatic conjugated dienes ethylene-propylene copolymers, and EPDM rubber.

5. A composition in accordance with claim 1 wherein the rubber modified vinyl aromatic polymer is acrylonitrile-butadiene-styrene.

6. A composition in accordance with claim 1 wherein the rubber modified vinyl aromatic polymer is high impact polystyrene.

7. A composition in accordance with claim 1 wherein the rubber modified vinyl aromatic polymer is methyl-metharylate-butadiene-styrene.

8. A composition in accordance with claim 1 wherein the rubber modified vinyl aromatic compound is styrene-ethylene-butylene-styrene.

9. A composition in accordance with claims 1, 5, 6, 7, or 8 wherein the polyetherimide has the formula:

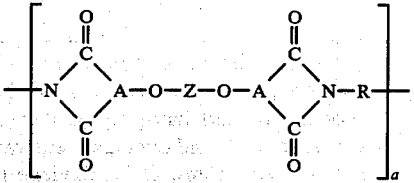

where a represents a whole number in excess of 1, the group —O—A< is selected from:

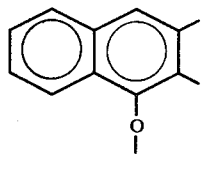 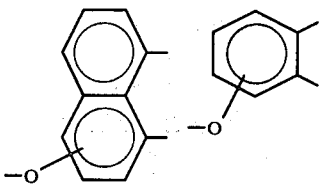 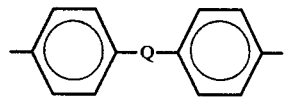

R' being hydrogen, lower alkyl or lower alkoxy, Z is a member of the class consisting of (1)

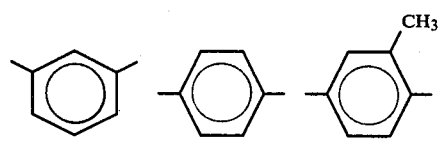

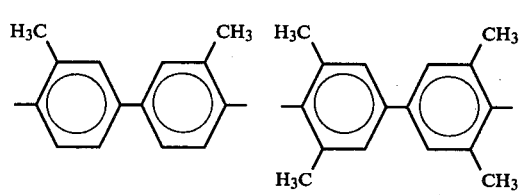

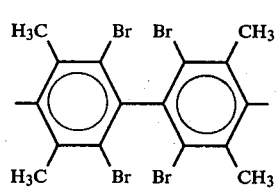

and (2) divalent organic radicals of the general formula:

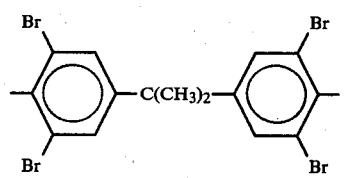

where X is a member selected from the class consisting of divalent radicals of the formulas,

where q is 0 or 1, y is a whole number from 1 to 5, and R is a divalent organic radical selected from the class consisting of (1) aromatic hydrocarbon radicals having from 6–10 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

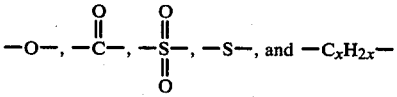

where Q is a member selected from the class consisting of

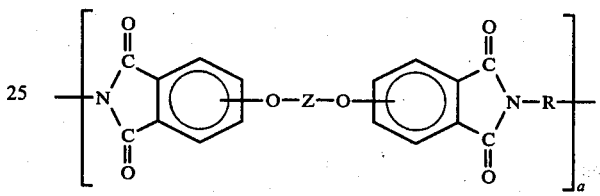

where x is a whole number from 1 to 5 inclusive.

10. A composition in accordance with claim 9 wherein the polyetherimide is of the formula:

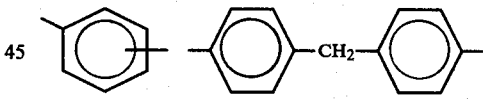

and the divalent bonds of the —O—Z—O— radical are in the 3,3'; 3,4'; 4,3' or the 4,4' position.

11. A composition in accordance with claim 10 wherein Z is;

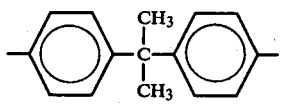

and R is selected from;

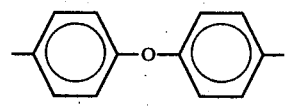

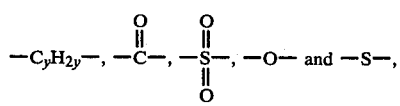

12. A composition in accordance with claim 7 wherein the polyetherimide is of the formula:

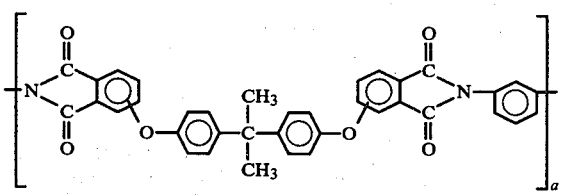

* * * * *

UNITED STATES PATENT AND TRADEMARK OFFICE
CERTIFICATE OF CORRECTION

PATENT NO. : 4,393,168
DATED : July 12, 1983
INVENTOR(S) : Giles, Jr. et al.

It is certified that error appears in the above-identified patent and that said Letters Patent is hereby corrected as shown below:

Claim 9, column 15, lines 1-10,

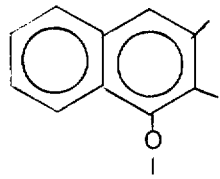 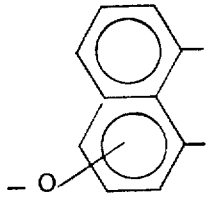 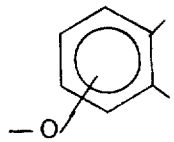

should be

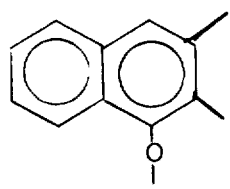 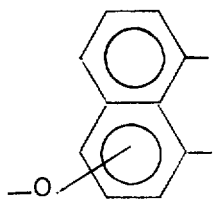 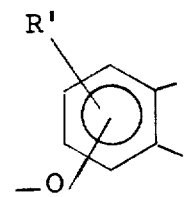

Signed and Sealed this

Tenth Day of April 1984

[SEAL]

Attest:

GERALD J. MOSSINGHOFF

Attesting Officer     Commissioner of Patents and Trademarks